(12) United States Patent
Li et al.

(10) Patent No.: US 6,194,073 B1
(45) Date of Patent: Feb. 27, 2001

(54) SYNTHESIS AND USE OF HETEROGENEOUS POLYMER GELS

(75) Inventors: Yong Li, Appleton, WI (US); Zhibing Hu, Denton, TX (US); Xiaomin Zhang, Appleton, WI (US)

(73) Assignee: Kimberly-Clark Worldwide, Inc, Neenah, WI (US)

( * ) Notice: Subject to any disclaimer, the term of this patent is extended or adjusted under 35 U.S.C. 154(b) by 0 days.

(21) Appl. No.: 09/432,137

(22) Filed: Nov. 2, 1999

Related U.S. Application Data

(62) Division of application No. 08/768,163, filed on Dec. 13, 1996, now Pat. No. 5,976,648.
(60) Provisional application No. 60/008,644, filed on Dec. 14, 1995.

(51) Int. Cl.$^7$ .............................. C08F 6/24; C08F 20/56; C08F 20/58; F03G 7/06
(52) U.S. Cl. ..................... 428/420; 428/35.7; 428/36.91; 428/34.9; 428/515; 428/516
(58) Field of Search ................................. 428/34.9, 35.7, 428/36.91, 420, 515, 516

(56) References Cited

U.S. PATENT DOCUMENTS

| | | | |
|---|---|---|---|
| Re. 35,068 | 10/1995 | Tanaka et al. | 523/300 |
| 3,937,851 | 2/1976 | Bellanca et al. | 426/450 |
| 4,732,930 | 3/1988 | Tanaka et al. | 524/742 |
| 5,100,933 | 3/1992 | Tanaka et al. | 523/300 |
| 5,183,879 | 2/1993 | Yuasa et al. | 528/503 |
| 5,242,491 | 9/1993 | Mamada et al. | 106/241 |
| 5,250,167 | 10/1993 | Adolf et al. | 204/299 R |
| 5,288,214 | 2/1994 | Fukuda et al. | 417/395 |
| 5,334,629 | 8/1994 | Zirino | 523/137 |
| 5,336,057 | 8/1994 | Fukuda et al. | 417/395 |
| 5,389,222 | 2/1995 | Shahinpoor | 204/299.2 |
| 5,403,893 | 4/1995 | Tanaka et al. | 525/218 |
| 5,426,154 | 6/1995 | Mikami et al. | 525/296 |
| 5,532,006 | 7/1996 | Lauterber et al. | 424/9.322 |
| 5,578,069 | 11/1996 | Miner, II | 607/126 |
| 5,580,929 | 12/1996 | Tanaka et al. | 525/218 |
| 5,879,694 | 3/1999 | Morrison et al. | 424/405 |
| 5,976,648 * | 11/1999 | Li et al. | 428/34.9 |

FOREIGN PATENT DOCUMENTS

| | | |
|---|---|---|
| 0 365 011 A2 | 4/1990 | (EP) . |
| 63-20665 * | 8/1888 | (JP) .............................. G01N/25/02 |
| 2-155952 | 6/1990 | (JP) . |
| 03-701A | 1/1991 | (JP) . |
| 7-82325A | 3/1995 | (JP) . |
| 7-292040 | 11/1995 | (JP) . |
| WO 91/05816 A1 | 5/1991 | (WO) . |
| WO 92/02005 A2 | 2/1992 | (WO) . |
| WO 95/31498 A1 | 11/1995 | (WO) . |

OTHER PUBLICATIONS

Hu, Zhibing, Xiaomin Zhang and Yong Li, "Synthesis and Application of Modulated Polymer Gels", *Science*, vol. 269, Jul. 28, 1995, pp. 525–527.

Derwent World Patent Database abstract of JP 01–034,435: Description of Agency of Ind. Sci. & Technology, "Thermosensitive Gel For Energy Conversion or Storage".

Derwent World Patent Database abstract of JP 01–270,936: Description of Agency of Ind. Sci. & Technology, "Temperature Responsive Porous Gel".

Osada, Yoshihito and Atsushi Matsuda, "Shape Memory in Hydrogels", *Nature*, vol. 376, Jul. 20, 1995, p. 219.

Chemical Abstracts 121:232602, "Bending Behavior of a Poly(Vinyl Alcohol)–(Poly(acrylic acid) Hydrogel Rod", Jun. 1994.

* cited by examiner

*Primary Examiner*—Ellis Robinson
*Assistant Examiner*—Sandra M. Nolan
(74) *Attorney, Agent, or Firm*—Kilpatrick Stockton, LLP

(57) ABSTRACT

Disclosed is a heterogeneous polymer gel comprising at least two gel networks. One embodiment of the present invention concerns a heterogeneous polymer gel comprising a first gel network comprising an environmentally-stable gel and a second gel network comprising an environmentally-unstable gel wherein the first gel network interpenetrates the second gel network. The heterogeneous polymer gel exhibits controlled changes in volume in response to environmental changes in condition, such as of temperature or of chemical composition.

18 Claims, No Drawings

SYNTHESIS AND USE OF HETEROGENEOUS POLYMER GELS

CROSS-REFERENCE TO RELATED PATENT APPLICATIONS

This patent application is a divisional patent application of U.S. patent application Ser. No. 08/768,163, filed on Dec. 13, 1996, now U.S. Pat. No. 5,976,648 which claims the benefit of priority to provisional U.S. patent application Ser. No 60/008,644, filed on Dec. 14, 1995, abandoned both of which are incorporated herein by reference.

BACKGROUND OF THE INVENTION

1. Field of the Invention

The present invention relates to a heterogeneous polymer gel comprising at least two gel networks. The heterogeneous polymer gel exhibits controlled changes in volume in response to external environmental changes.

2. Description of the Related Art

Relatively uniform or homogeneous polymer gels have attracted much interest because their volume can be changed by several orders of magnitude in response to the change of an external factor such as solvent, temperature, electric field, or light. Uses of such homogeneous polymer gels include such applications as artificial muscles, drug-delivery devices, chemical valves and actuators, and magnetic resonance monitoring agents.

It is desirable to develop and produce new polymer gels that exhibit desired reversible characteristics in response to external environmental changes.

SUMMARY OF THE INVENTION

In one aspect, the present invention concerns a heterogeneous polymer gel comprising at least two gel networks. The heterogeneous polymer gel is characterized in that it exhibits desired changes in volume in response to external environmental changes.

One embodiment of the present invention concerns a heterogeneous polymer gel comprising a first gel network comprising an environmentally-stable gel and a second gel network comprising an environmentally-unstable gel wherein the first gel network interpenetrates the second gel network.

One embodiment of the present invention concerns a heterogeneous polymer gel comprising a first gel layer comprising an environmentally-stable gel and a second gel layer comprising an environmentally-unstable gel wherein the first gel layer is attached to the second gel layer.

In another aspect, the present invention concerns a method of using a heterogeneous polymer gel comprising at least two gel networks.

In one embodiment of the present invention, a method of using a heterogeneous polymer gel, comprising an environmentally-stable gel and an environmentally-unstable gel, comprises heating the heterogeneous gel to a temperature effective to result in a desired change in volume in the environmentally-unstable gel.

DETAILED DESCRIPTION OF THE PREFERRED EMBODIMENTS

The present invention concerns a class of materials based on the spatial modulation of the chemical nature of gels. The modulation is achieved by allowing only part of one gel network to interpenetrate with another gel network. The resultant gels have an internally heterogeneous or modulated structure.

The heterogeneous polymer gel of the present invention generally comprises a first polymer gel network comprising an environmentally-stable polymer gel and a second polymer gel network comprising an environmentally-unstable polymer gel wherein the first polymer gel network interpenetrates the second polymer gel network.

As used herein, "an environmentally-stable polymer gel" is intended to represent a polymer gel that remains substantially inert or unchanged as the environment surrounding the polymer gel undergoes a change in conditions, such as in physical or chemical conditions. In particular, it is desired that the environmentally-stable polymer gel does not exhibit a substantial change in volume as the conditions of the environment surrounding the environmentally-stable polymer gel undergoes a change.

As used herein, "an environmentally-unstable polymer gel" is intended to represent a polymer gel that exhibits a substantial change in its physical characteristics as the environment surrounding the polymer gel undergoes a change in conditions, such as in physical or chemical conditions. In particular, it is desired that the environmentally-unstable polymer gel exhibits a substantial change in volume as the conditions of the environment surrounding the environmentally-unstable polymer gel undergoes a change.

Polymer gels that have been found to be useful in the present invention include N-isopropylacrylamide gels and polyacrylamide gels.

As used herein, the "environment" for a polymer gel is intended to represent the physical surroundings of the polymer gel. Generally, the environment of a polymer gel will be a liquid or a gas surrounding the polymer gel. For example, the environment of a polymer gel may be an aqueous solution or air.

In order to cause a substantial change in the physical characteristics of an environmentally-unstable polymer gel, it is generally necessary that the environment surrounding the environmentally-unstable polymer gel undergoes a change in conditions. As will be appreciated by those skilled in the art, the change in environmental conditions necessary to cause a substantial change in the physical characteristics of an environmentally-unstable polymer gel will generally be dependent on the specific environmentally-unstable polymer gel being used in a particular heterogeneous polymer gel. Such a change in conditions can, for example, be a change in the temperature, the pH, or the chemical composition of the environment.

In the present invention, it is generally desired that the environment is substantially uniform and/or that the change in conditions be applied to the environment in a substantially uniform manner. As such, it is generally not necessary to induce a gradient of an environmental property, such as temperature or electric field, to the environment in order to achieve the desired substantial change in the physical characteristics of an environmentally-unstable polymer gel.

In one embodiment of the present invention, an ionic N-isopropylacrylamide gel, prepared with sodium acrylate, shrinks substantially in volume when in an aqueous solution at temperatures higher than about 37° C. In contrast, a polyacrylamide gel does not undergo a substantial change in volume when in an aqueous solution at temperatures higher than about 37° C. As such, a heterogeneous polymer gel may be prepared comprising polyacrylamide gel as the environmentally-stable polymer gel and an ionic N-isopropylacrylamide gel as the environmentally-unstable polymer gel, wherein the environment is an aqueous solution, and the change in conditions for the environment will be a change in temperature from less than about 37° C. to greater than about 37° C.

In another embodiment of the present invention, a polyacrylamide gel shrinks substantially in volume when in a water/acetone solution that comprises at least about 34 weight percent acetone. In contrast, an N-isopropylacrylamide gel does not undergo a substantial change in volume when in a water/acetone solution that comprises at least about 34 weight percent acetone. As such, a heterogeneous polymer gel may be prepared comprising an ionic N-isopropylacrylamide gel as the environmentally-stable polymer gel and a polyacrylamide gel as the environmentally-unstable polymer gel, wherein the environment is a water/acetone solution, and the change in conditions for the environment will be a change in acetone concentration from less than about 34 weight percent to greater than about 34 weight percent.

As such, as will be appreciated by one skilled in the art, a polymer gel that is used as an environmentally-stable polymer gel in one environment, or under a particular change in conditions for that environment, may alternatively be used as an environmentally-unstable polymer gel in another environment, or under a different change in conditions for the original environment.

As also will be appreciated by one skilled in the art, it may be desirable to selectively choose the environmentally-stable polymer gel and the environmentally-unstable polymer gel that are being used so as to maximize the difference in properties between the two gels relevant to the change in conditions that are intended to be made to an environment. For example, if the temperature of the environment is to be changed so as to induce a change in the volume of the environmentally-unstable polymer gel, it may be desirable to maximize the difference in the thermal expansion coefficients of the two gels. In particular, an ionic N-isopropylacrylamide gel may shrink to half of its original size per degree Celsius near the transition point of about 37° C. In contrast, a polyacrylamide gel essentially has no change in volume near this temperature. As such, the difference in thermal expansion coefficients for these two gels can be as high as about 0.5 per degree of Celsius. In contrast, the difference of expansion coefficients for a typical bimetallic strip of brass and steel is about $7 \times 10^{-6}$ per degree of Celsius. Thus, bigels can generally be made to be much more sensitive to environmental changes than can bimetals.

The form of a prepared heterogeneous polymer gel will depend to a large extent on the use for which it is intended. One suitable form is a bigel strip comprising two gel networks or layers in contact with each other wherein one of the gel networks interpenetrates the other gel network. When placed into an environment, and then subjecting the environment to an effective change in conditions, such a bigel strip will typically change in shape, bending for example, from an essentially straight shape to almost a circle.

Another suitable form is a bigel composite comprising a gel matrix prepared from a first polymer gel in contact with, at least at two separate locations, gel networks of a second polymer gel. When placed into an environment, and then subjecting the environment to an effective change in conditions, such a bigel composite will typically change in shape, bending, for example, from an essentially straight shape to a pentagon shape and then to a quadrangle shape.

Another suitable form is a bigel composite comprising a gel matrix in the shape of a cylinder prepared from a first polymer gel that includes at least two gel network strips of a second polymer gel that are located in different locations around the circumference of the cylinder. When placed into an environment, and then subjecting the environment to an effective change in conditions, such a bigel composite will typically change in shape with the ends of the cylinder bending relatively open and then relatively closed. Such a change in shape may allow the bigel composite to grasp or release an object as the environmental conditions change.

The amount of bending a bigel composite exhibits as the environmental conditions change may be quantified by the bending angle, theta ($\theta$), defined to be the angle between the two tangents of a gel arc at two ends. The strain (s) induced in a gel is then equal to:

$$s=(\theta d)/L$$

wherein "d" represents the thickness of the gel and "L" represents the length of the gel. This equation should be valid even for large bending. Using this equation, it was found that a strain of up to about 50 percent could be produced in a bigel composite.

The properties of heterogeneous polymer gels of this invention would enable them to function as gel display devices, switches, valves, and other similar applications.

EXAMPLES

Example 1

A bigel strip was prepared by first making a N-isopropylacrylamide gel slab. Two glass slides with about a 1.0 millimeter gap between them were immersed in about 100 milliliters of an aqueous solution of about 690 millimoles of N-isopropylacrylamide, about 8.6 millimoles of methylene-bis-acrylamide, and about 8 millimoles of sodium acrylate. The polymerization of the solution was initiated by the addition of about 240 microliters of tetramethylethylenediamine and about 40 milligrams of ammonium persulfate. About 20 percent of the water in the N-isopropylacrylamide gel was evaporated for a better subsequent interpenetration process. The resulting product was an N-isopropylacrylamide gel slab having a thickness of about 1.2 millimeters.

In the second step, the N-isopropylacrylamide gel slab prepared in the first step was placed between, but in contact with, one of two glass slides with about a 2 to 3 millimeter gap between them, such that the distance between the two glass slides was larger than the thickness of the N-isopropylacrylamide gel slab. The glass slides and N-isopropylacrylamide gel slab were immersed in an acrylamide gel solution prepared from about 700 millimoles of acrylamide and about 8.6 millimoles of methylene-bisacrylamide. The acrylamide gel solution was allowed to diffuse into the N-isopropylacrylamide gel slab for about one hour before polymerization of the acrylamide was initiated, thus, ensuring the formation of a N-isopropylacrylamide/polyacrylamide interpenetrating network. The end product was a bigel slab about 2 to 3 millimeters thick with a layered network structure having a polyacrylamide gel network about 0.8 to about 1.8 millimeters thick and an N-isopropylacrylamide gel network interpenetrated by a polyacrylamide gel network about 1.2 millimeters thick.

The heterogeneous bigel slab was immersed in water at about 22° C. The bigel slab swelled and bent slightly toward the polyacrylamide gel network side. The temperature of the water was gradually increased to about 37.8° C. The N-isopropylacrylamide gel network was observed to shrink substantially, whereas the polyacrylamide gel network was generally insensitive to the temperature change. As a result, the bigel slab bent into an arc towards the N-isopropylacrylamide gel network side. The transition between the straight and arc positions was found to be reversible as the temperature is varied between about 22° C. and about 37.8° C. The variation in the degree of bending in nine sequential straight-bending-straight cycles was less than about 3 percent.

The heterogeneous bigel slab was immersed in a water-acetone solution comprising about 20 percent acetone. The bigel slab swelled but remained relatively straight. The heterogeneous bigel slab was then immersed in a water-acetone solution comprising about 45 percent acetone. The polyacrylamide gel network was observed to shrink substantially, whereas the N-isopropylacrylamide gel network was generally insensitive to the acetone change. As a result, the bigel slab bent into an arc towards the polyacrylamide gel network side.

Example 2

A gel with a more complex modulated structure was prepared in a manner similar to that used for the bigel slab of Example 1. A polyacrylamide gel network was modulated with a N-isopropylacrylamide gel network at four locations. Four N-isopropylacrylamide gel pieces were placed on a glass plate with adjacent gel pieces separated by about 12 millimeters. An acrylamide gel solution was then allowed to diffuse into the N-isopropylacrylamide gel pieces for about one hour before polymerization of the acrylamide was initiated, thus, ensuring the formation of N-isopropylacrylamide/polyacrylamide interpenetrating networks. The end product was a bigel slab about 2 to 3 millimeters thick with a layered network structure having a polyacrylamide gel network about 0.8 to about 1.8 millimeters thick and four N-isopropylacrylamide gel networks interpenetrated by a polyacrylamide gel network about 1.2 millimeters thick.

The heterogeneous bigel slab was immersed in water at about 22° C. The bigel slab swelled and was essentially straight. The temperature of the water was gradually increased to about 39° C. Each of the N-isopropylacrylamide gel networks were observed to begin bending to an angle of about 70 degrees, whereas the polyacrylamide gel network was generally insensitive to the temperature change. As a result, the bigel slab bent into a pentagon-like shape. The temperature of the water was gradually increased to about 41° C. Each of the N-isopropylacrylamide gel networks were observed to further bend to an angle of about 90 degrees, whereas the polyacrylamide gel network was still generally insensitive to the temperature change. As a result, the bigel slab bent into a quadrangle-like shape. The transition between the different positions was found to be reversible as the temperature was varied between the different temperatures.

Example 3

Two bigel strips were prepared according to the procedure of Example 1. The end products were bigel slabs about 3 to 4 millimeters thick with a layered network structure having a polyacrylamide gel network about 2.1 millimeters thick and an N-isopropylacrylamide gel network interpenetrated by a polyacrylamide gel network about 1.5 millimeters thick.

A gel "hand" was prepared using the two bigel strips that were tied together at one end with a spacer. The N-isopropylacrylamide gel networks of each bigel strip face each other. The structure was immersed into water at about 22° C. The bigel slabs swelled and bent slightly toward the polyacrylamide gel network sides so that the end of the structure was relatively open. The temperature of the water was gradually increased to about 35° C. The N-isopropylacrylamide gel networks were observed to shrink substantially, whereas the polyacrylamide gel networks were generally insensitive to the temperature change. As a result, the bigel slabs bent towards each other so that the end of the structure was relatively closed. As the structure closed, the structure enclosed or grasped a small object that was floating in the water. As the temperature of the water was reduced to about 22° C., the bigel slabs returned to being relatively straight so that the end of the structure opened and released the small object.

What is claimed is:

1. A method of using a heterogeneous polymer gel to produce reversible characteristics in response to external environmental changes, wherein the heterogeneous polymer gel comprises a first gel network comprising an environmentally-stable gel and a second gel network comprising an environmentally-unstable gel wherein the first gel network interpenetrates the second gel network, the method comprising placing the heterogeneous polymer gel into a first environment wherein the environmentally-unstable gel exhibits a first volume and then placing the heterogeneous polymer gel into a second environment wherein the environmentally-unstable gel exhibits a second volume.

2. The method of claim 1 wherein the second volume is less than the first volume.

3. The method of claim 1 wherein the second volume is greater than the first volume.

4. The method of claim 1 wherein the environmentally-stable gel comprises polyacrylamide, the environmentally-unstable gel comprises N-isopropylacrylamide, the first environment is an aqueous solution having a temperature that is less than about 37° C., and the second environment is an aqueous solution having a temperature that is greater than about 37° C.

5. The method of claim 1 wherein the environmentally-stable gel comprises N-isopropylacrylamide, the environmentally-unstable gel comprises polyacrylamide, the first environment is a first solution comprising water and acetone wherein the first solution comprises less than about 34 weight percent of acetone, and the second environment is a second solution comprising water and acetone wherein the second solution comprises greater than about 34 weight percent of acetone.

6. The method of claim 1 wherein the first environment has a pH, the second environment has a pH, and the second environment has a pH that is greater than the pH of the first environment.

7. The method of claim 1 wherein the first environment has a pH, the second environment has a pH, and the second environment has a pH that is less than the pH of the first environment.

8. The method of claim 1 wherein the first environment has a temperature, the second environment has a temperature, and the second environment has a temperature that is greater than the temperature of the first environment.

9. The method of claim 1 wherein the first environment has a temperature, the second environment has a temperature, and the second environment has a temperature that is less than the temperature of the first environment.

10. A method of using a heterogeneous polymer gel to produce reversible characteristics in response to external environmental changes, wherein the heterogeneous polymer gel comprises a first gel network comprising an environmentally-stable gel and a second gel network comprising an environmentally-unstable gel wherein the first gel network interpenetrates the second gel network, the method comprising placing the heterogeneous polymer gel into a first environment wherein the heterogeneous polymer gel exhibits a first bending angle and then placing the heterogeneous polymer gel into a second environment wherein the heterogeneous polymer gel exhibits a second bending angle.

11. The method of claim 10 wherein the second bending angle is greater than the first bending angle.

12. The method of claim 10 wherein the second bending angle is less than the first bending angle.

13. The method of claim 10 wherein the environmentally-stable gel comprises polyacrylamide, the environmentally-unstable gel comprises N-isopropylacrylamide, the first environment is an aqueous solution having a temperature that is less than about 37° C., and the second environment is an aqueous solution having a temperature that is greater than about 37° C.

14. The method of claim 10 wherein the environmentally-stable gel comprises N-isopropylacrylamide, the environmentally-unstable gel comprises polyacrylamide, the first environment is a first solution comprising water and acetone wherein the first solution comprises less than about 34 weight percent of acetone, and the second environment is a second solution comprising water and acetone wherein the second solution comprises greater than about 34 weight percent of acetone.

15. The method of claim 10 wherein the first environment has a pH, the second environment has a pH, and the second environment has a pH that is greater than the pH of the first environment.

16. The method of claim 10 wherein the first environment has a pH, the second environment has a pH, and the second environment has a pH that is less than the pH of the first environment.

17. The method of claim 10 wherein the first environment has a temperature, the second environment has a temperature, and the second environment has a temperature that is greater than the temperature of the first environment.

18. The method of claim 10 wherein the first environment has a temperature, the second environment has a temperature, and the second environment has a temperature that is less than the temperature of the first environment.

* * * * *